United States Patent [19]
Stenneler et al.

[11] Patent Number: 5,900,134
[45] Date of Patent: May 4, 1999

[54] METHOD AND APPARATUS FOR THE SERIAL PRODUCTION OF PARTS BY ELECTROCHEMICAL MACHINING

[75] Inventors: Jacques Marie Pierre Stenneler, Le Chatelet en Brie; Pierre Marc Serge Lechervy, Ste Genevieve des Bois, both of France

[73] Assignee: Societe Nationale d'Etude et de Construction de Monteurs d'Aviation "SNECMA", Paris, France

[21] Appl. No.: 08/775,747

[22] Filed: Dec. 31, 1996

[51] Int. Cl.$^6$ ................. B23H 3/00; B23H 7/30; B23H 7/28
[52] U.S. Cl. ............. 205/640; 205/660; 204/224 M; 204/225; 204/277
[58] Field of Search ............. 205/640, 660; 204/224 M, 225, 277

[56] References Cited

U.S. PATENT DOCUMENTS 3,311,549  3/1967  Bruns ................. 204/225 X
4,052,284  10/1977 Schrader ............. 204/224 M
4,057,475  11/1977 Schrader ............. 205/660

FOREIGN PATENT DOCUMENTS 0 227 223  7/1987  European Pat. Off. .
1 939 284  2/1970  Germany .

Primary Examiner—Donald R. Valentine
Attorney, Agent, or Firm—Oblon, Spivak, McClelland, Maier & Neustadt, P.C.

[57] ABSTRACT

A method and apparatus is described for producing a large number of identical parts from a bar of material by electrochemical machining without the intervention of an operator. The apparatus comprises a spindle for supporting the bar and periodically feeding it in the direction of its axis, and an electrochemical machining assembly comprising cathodes for shaping the leading end portion of the bar to form the part. After the part has been shaped, it is electrochemically cut from the bar, and the bar is advanced longitudinally by the spindle in order to proceed with the machining of the next part.

17 Claims, 3 Drawing Sheets

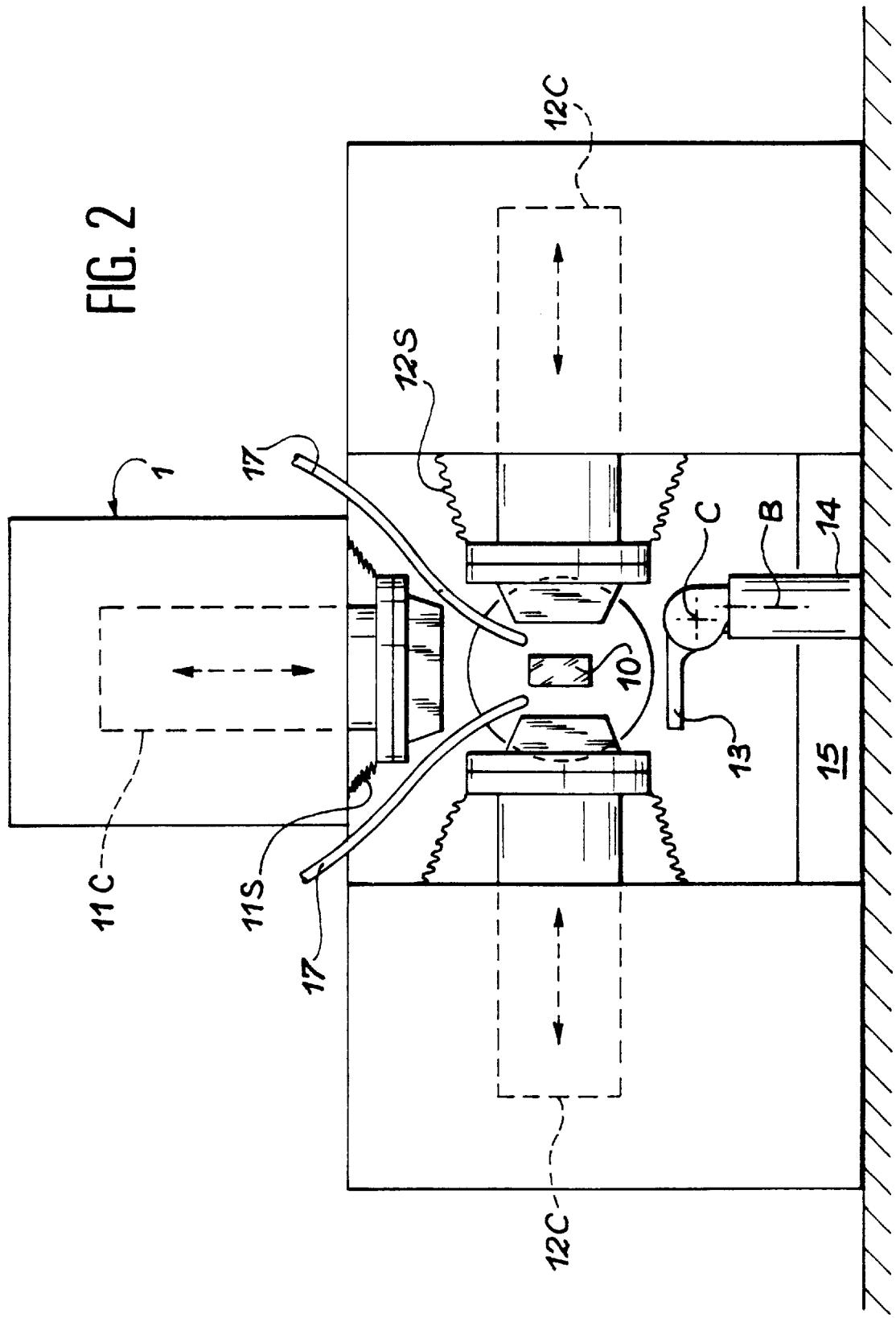

METHOD AND APPARATUS FOR THE SERIAL PRODUCTION OF PARTS BY ELECTROCHEMICAL MACHINING

BACKGROUND OF THE INVENTION

1. Field of the Invention

The invention relates to the mass-production of metallic parts of relatively small volume by electrochemical machining. In particular, it relates to the manufacture of parts of complex shape, such as turbine blades, supports or levers.

2. Summary of the Prior Art

It is known to manufacture metal parts of complex shape by electrochemical machining. The various electrodes employed have machining surfaces which correspond to the shapes to be formed on the part. However, in order to machine a part, it is necessary to position it and fix it in this position on the machining apparatus, and after completion of the machining it is necessary to release the part from its fixed mounting. Furthermore, in order to achieve precise positioning of the part it is necessary to provide the part with at least one reference surface.

These operations are relatively troublesome since they require the intervention of an operator to fix the part and also the machining of the reference surface.

BRIEF DESCRIPTION OF THE INVENTION

The object of the invention is to overcome these drawbacks by proposing a method and apparatus for electrochemically machining identical parts on a serial basis without requiring the intervention of an operator between successive parts, nor the machining of a reference surface.

For this purpose the invention proposes to adapt to electrochemical machining, techniques which are known in the field of turning, that is to say the machining of parts of revolution using turret lathes or automatic lathes. This type of machine is capable of machining a series of identical parts from one and the same metal bar by automatic feeding and stepping of the bar through the spindle of the lathe.

Accordingly, in a first aspect of the invention there is provided a method of producing three-dimensional parts from a metal bar by electrochemical machining using at least one machining cathode, comprising the steps of:

mounting said metal bar for movement in the direction of its longitudinal axis;

connecting a source of electric current to said metal bar;

moving said metal bar forwardly in the direction of said longitudinal axis to bring a leading end portion of said metal bar into a position for machining by said at least one cathode;

advancing said at least one cathode into said bar to electrochemically machine said leading end portion to the required shape;

cutting through said bar at the rear end of the part produced by said electrochemical machining of said leading end portion; and, moving said metal bar forwardly to bring a sufficient length of the bar into said electrochemical machining position for producing the next part.

The cutting of the bar is preferably also carried out electrochemically using a cutting electrode.

The electric current source may be connected to the bar either by a braid which is attached to the bar, or by the jaws of a clamping mandrel which is used to grip the bar and hold it in position when the bar is in the machining position.

The initial cross-section of the bar may be selected to suit optimally the geometry of the parts to be produced, and preferably the bar is mounted so that it can be turned about its longitudinal axis in order that machining may be carried out over the entire periphery of the bar.

The electrolytic liquid used in the machining process must wet the surfaces of the leading end portion of the bar, and may be applied thereto by means of a jet which discharges onto the said surfaces or by using a spray.

According to a second aspect of the invention there is also provided an apparatus for producing three-dimensional parts from a metal bar by electrochemical machining, comprising:

a frame;

a spindle for holding and feeding said metal bar and defining a longitudinal axis, said spindle including means for supporting said bar with its axis substantially aligned with said longitudinal axis, a device for feeding said bar along said axis to move the leading end portion of said bar beyond said spindle, and a device for clamping said bar adjacent said leading end portion;

an electrochemical machining assembly including at least one machining cathode located outside said spindle and slidably mounted so as to be able to advance into said leading end portion of said bar projecting beyond said spindle, and means for feeding an electrolyte to wet said leading end portion of said bar; and, means for controlling said spindle and said electrochemical machining assembly;

said spindle also including sealing means for preventing electrolyte liquid from travelling back along said bar to reach said clamping device and said feeding device.

Preferably, the sealing means comprises means defining a cavity surrounding said bar, and means for supplying air to said cavity at a pressure higher than atmospheric pressure, said cavity defining means allowing the air to escape around the bar in a direction towards said leading end of the bar.

Preferably, the longitudinal axis of the spindle is horizontal, and the machining assembly may include a knife-shaped cathode for use in cutting off the leading end portion of the bar after it has been machined to form the required part.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BRIEF DESCRIPTION OF THE DRAWINGS

FIG. 2 is a diagrammatic end view of the apparatus shown in FIG. 1;

DESCRIPTION OF THE PREFERRED EMBODIMENTS

Figure 1:
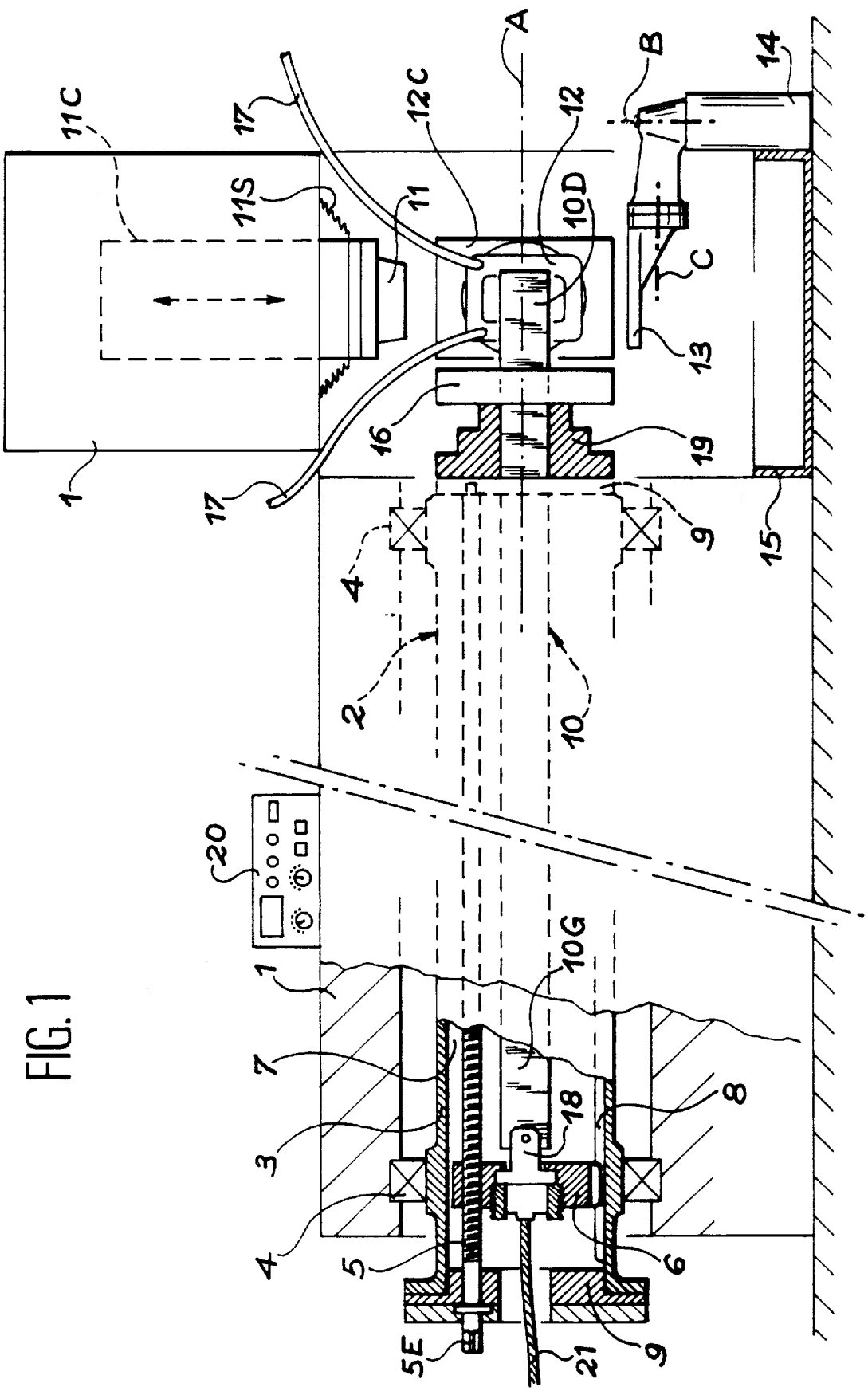
FIG. 1 is a diagrammatic side view of one embodiment of the apparatus according to the invention.

With reference to FIG. 1, the apparatus in accordance with the invention comprises a frame 1 which houses a horizontally mounted spindle for holding and feeding a bar 10 which is to be machined. This spindle 2 is hollow, defining a chamber 7 within which the bar 10 is placed, and is mounted to rotate about its longitudinal axis A by means of bearings 4. It should be noted that this rotation takes place through only 90°, and is not permanent as on a lathe for machining involving the removal of material.

The bar 10 is mounted horizontally in the cylindrical spindle 2 so that it extends along the axis A, and is arranged to be movable along this axis A. For this purpose, a translatory ring 6 is mounted to slide on a horizontal rail 8 situated inside the spindle 2, and the bar 10 is secured to the ring 6 by means of a fixing piece 18 which is fixed, for example by screws, to one end 10G of the bar 10 and is also fixed to the translatory ring 6. The linear movement of the ring may be achieved by rotating a screw threaded driving rod 5 which is rotatably supported at opposite ends of the spindle by two lateral webs 9 and is threadably engaged with the ring 6 inside the spindle 2. The rotary drive for the rod 5 is not illustrated, but it may be constituted by a motor arranged to rotate the rod 5 though a drive tang at its end 5E.

It will thus be appreciated that the bar 10 can be moved along the axis A in such a way that the leading end 10D (i.e. the right-hand end in the drawing) of the bar 10 can be advanced beyond the spindle and into a machining assembly at the right-hand part of the apparatus. A device is provided for clamping the bar 10 in the machining position, and in the embodiment shown this takes the form of a clamping mandrel 19 carried by the spindle as close as possible to the machining assembly.

Figure 3A:
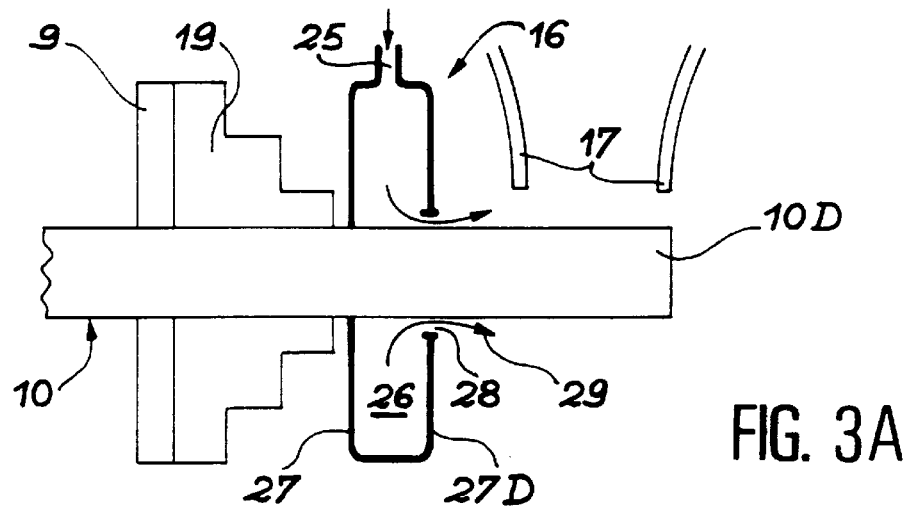
FIG. 3A is a sketch view of part of the apparatus of FIG. 1 showing the construction of the sealing device.

The sealing of the inside of the spindle 2 is ensured by a chamber 16 which is placed at the right-hand end of the spindle 2 and is arranged to prevent electrolytic liquid from entering the spindle 2 between the bar 10 and the lateral web 9. The embodiment of the pressure chamber 16 shown in FIG. 1 is illustrated in greater detail in FIG. 3A. The chamber comprises a compressed air supply duct 25 which discharges into a cavity 26 which surrounds the bar 10 and accumulates air under pressure. The inside diameter of the right-hand lateral wall 27D of the cavity 26 is very slightly larger than the outside diameter of the bar 10, and thus defines an annular orifice 28. As indicated by the arrows 29, the compressed air escapes through this orifice 28 around the bar 10 in a direction towards the right-hand end 10D of the bar. In this way, the compressed air repels the moisture or liquid electrolyte which is supplied to the leading end portion of the bar via ducts 17 during the machining process.

Figure 3B:
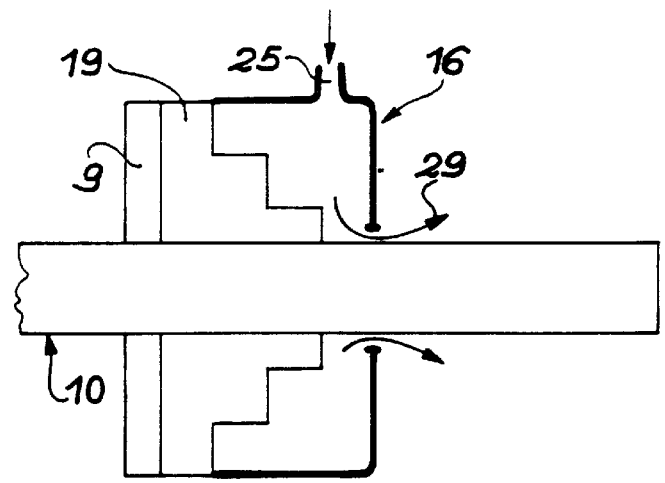
FIG. 3B is a view similar to FIG. 3A but showing a different embodiment of the sealing device; and, FIG. 3C is a view similar to FIGS. 3A and 3B but showing a third embodiment of the sealing device.

In an alternative embodiment shown in FIG. 3B, the lateral walls 27 of the over-pressure chamber 16 forming the cavity 26 are much wider apart in order to encase the jaws of the clamping mandrel 19. The clamping mandrel is therefore protected from moisture of any kind as well as from permeation by electrolytic liquid.

Figure 3C:
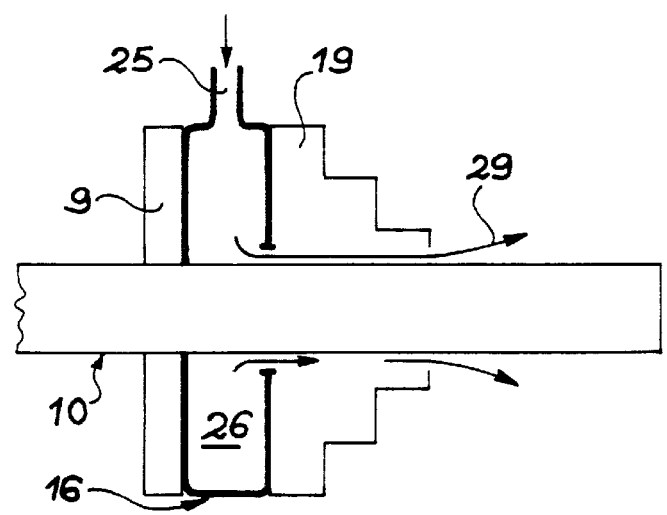

In a third embodiment shown in FIG. 3C, the over-pressure chamber 16 is placed immediately behind the jaws of the clamping mandrel 19 and in front of the lateral web 9. In this way, the compressed air escaping from the chamber 26 through the orifice 28 discharges between the jaws of the clamping mandrel 19 and the bar 10 towards the zone wetted by electrolytic liquid as indicated by the arrows 29.

The bar 10 is arranged to receive electric current via a cable or braid 21 connected to the fixing piece 18 disposed at the left-hand end 10G of the bar 10, but the current could instead be supplied via the jaws of the clamping mandrel 19.

The machining assembly is provided with a plurality of machining electrodes 11, 12 mounted to move, preferably at right-angles to the axis A, towards the leading end portion of the bar 10. For this purpose, they are fixed on respective carriages 11C and 12C which are mounted to slide in relation to the frame 1 of the apparatus. Respective bellows, for example 11S, 12S, ensure sealing of these carriages 11C and 12C.

To complete the machining assembly there is a recovery tray 13 located under the leading end 10D of the bar 10. The recovery tray 13 is mounted to pivot on a base 14 so that it can be removed. FIGS. 1 and 2 show vertical and horizontal axes of rotation B and C respectively, representing two possible rotary movements of the tray 13 in order to recover the machined parts. Furthermore, an electrolyte collection tank 15 is disposed beneath the machining assembly.

The electrolyte can be conveyed in various ways to the leading end 10D of the bar 10. In the embodiment shown, two feed pipes 17 discharge over the leading end 10D so that it is completely wetted with the electrolytic liquid, especially opposite the electrochemical machining cathodes 11 and 12. The electrolyte supply pipes 17 may be fed by a high pressure pump, a filter and a system, not shown, for maintaining temperature so that, with the collection tank 15, there is an electrolyte circulation system.

FIG. 2 shows more clearly the arrangement of the electrochemical machining cathodes 11C and 12C around the bar 10. It will be understood that all the surfaces of the bar 10 may be machined by a plurality of cathodes 11, 12 situated around the bar 10, the tray 13 being capable of being retracted in order to allow space for an additional machining cathode if required.

It is envisaged that the operation of cutting off the machined end of the bar 10 after the machining operations have been completed may be carried out by one of the three cathodes 11C or 12C. This cathode may be a cutting cathode.

The apparatus is completed by means for controlling the forward feed of the bar 10 and the various movements of the machining cathodes 11C and 12C. It can also be arranged to control retraction of the recovery tray 13, supply of the liquid electrolyte, and regulation of the electrolyte temperature. Such control means is shown symbolically by a control panel 20 mounted on the frame 1 surrounding the spindle 2.

Operation of the apparatus will now described.

Assuming that cathodes are already available which are shaped for the production of the parts to be obtained, the first operation is to place these cathodes 11, 12 in position on the sliding carriages 11C, 12C of the machining apparatus. It is then necessary to set the starting positions of these cathodes 11, 12 and also to set the maximum forward movements of the cathodes.

The bar 10 from which the required parts are to be machined is then placed in position in the spindle 2 by:
 opening the jaws of the clamping mandrel 19;
 inserting the bar 10 into the spindle 2 and through the jaws of the clamping mandrel 19;
 fixing the translatory ring 6 to the left-hand end 10G of the bar 10; and
 moving the bar 10 forward until it reaches an axial starting reference position.

Machining can then be carried out as follows:
 controlled forward feed of the bar 10 to bring its leading end 10D into the machining position between the cathodes 11 and 12;
 locking the jaws of the clamping mandrel;
 forward feed of the machining cathodes, for example the cathodes 12, either simultaneously or one after another according to the geometry of the part to be machined; and return movement of the cathodes 11 and 12.

It is a requirement that the machined part, at this stage, is still connected to the bar 10 at its edge by a piece of material of small thickness. The part is then cut from the bar in the following manner:

- a quarter turn rotation of the spindle 2;
- rotation of the recovery tray 13 so that it is positioned under the machined part; and
- forward feed of the cutting cathode, for example the cathode 11, to attack and cut through the small remaining thickness of material to separate the machined part from the remainder of the bar 10.

The part is then recovered by:

- collecting the cut off machined part on the recovery tray 13;
- rotation of the recovery tray 13 through an angle of 180° about its vertical axis B;
- pivoting of the recovery tray 13 about its horizontal axis C; and
- recovery of the part in a handling tank (not shown).

Restoration of the apparatus to an operative condition in order to carry out machining of the next part is then carried out as follows:

- retraction of the cathodes 11 and 12;
- reverse pivoting and rotation of the recovery tray 13;
- reverse rotation of the spindle 12;
- opening of the jaws of the clamping mandrel 19;
- forward feed of the bar 10 to the machining position; and
- re-locking the jaws of the clamping mandrel.

The invention can be applied to the machining of a very wide variety of parts. It is particularly envisaged that it will be used to machine high-pressure compressor blades, the bar of material being slightly wider than the greatest dimension of the root of the blade.

We claim:

1. A method of producing three-dimensional parts from a metal bar by electrochemical machining using at least one machining cathode, comprising the steps of:
   mounting said metal bar for movement in the direction of its longitudinal axis;
   connecting a source of electric current to said metal bar;
   moving said metal bar fowardly in the direction of said longitudinal axis to bring a leading end portion of said metal bar into a position for machining by said at least one cathode;
   advancing said at least one cathode into said bar to electrochemically machine said leading end portion to the required shape;
   cutting through said bar at the rear end of the part produced by said electrochemical machining of said leading end portion;
   moving said metal bar forwardly to bring a sufficient length of the bar into said electrochemical machining position for producing the next part, and
   wetting the surfaces of said leading end portion of said bar with an electrolytic liquid by at least one jet discharging in proximity with said leading end of said bar.

2. A method according to claim 1, wherein said cutting through said bar is carried out electrochemically by a cutter electrode.

3. A method according to claim 1, which comprises connecting said electric current source to said bar by a braid which is attached to the bar.

4. A method according to claim 1, which comprises gripping said bar with a clamping mandrel having jaws when said bar is in said machining position, and connecting said electric current source to the bar by the jaws of said clamping mandrel.

5. A method according to claim 1, which comprises selecting the initial cross-section of the bar to suit optimally the geometry of the parts to be produced.

6. A method according to claim 1, which comprises mounting said bar so as to be rotatable about said longitudinal axis.

7. A method of producing three-dimensional parts from a metal bar by electrochemical machining using at least one machining cathode, comprising the steps of:
   mounting said metal bar for movement in the direction of its longitudinal axis;
   connecting a source of electric current to said metal bar;
   moving said metal bar fowardly in the direction of said longitudinal axis to bring a leading end portion of said metal bar into a position for machining by said at least one cathode;
   advancing said at least one cathode into said bar to electrochemically machine said leading end portion to the required shape;
   cutting through said bar at the rear end of the part produced by said electrochemical machining of said leading end portion;
   moving said metal bar forwardly to bring a sufficient length of the bar into said electromechanical machining position for producing the next part; and
   wetting the surface of said leading end portion of said bar with an electrolytic liquid using at least one spray.

8. A method according to claim 7, wherein said cutting through said bar is carried out electromechanically by a cutter electrode.

9. A method according to claim 7, which comprises connecting said electric current source to said bar by a braid which is attached to the bar.

10. A method according to claim 7, which comprises gripping said bar with a clamping mandrel having jaws when said bar is in said machining position, and connecting said electric current source to the bar by the jaws of said clamping mandrel.

11. A method according to claim 7, which comprises selecting the initial cross-section of the bar to suit optimally the geometry of the parts to be produced.

12. A method according to claim 7, which comprises mounting said bar so as to be rotatable about said longitudinal axis.

13. A method according to claim 7, wherein the step of wetting the surfaces of said leading end portion of said bar comprises wetting the surfaces by at least one jet discharging in proximity with said leading end of said bar.

14. An apparatus for producing three-dimensional parts from a metal bar by electrochemical machining, comprising:
   a frame;
   a spindle holding and feeding said metal bar and defining a longitidinal axis, said spindle including a support supporting said bar with a longitudinal axis thereof substantially aligned with said longitudinal axis of said bar, a device feeding said bar along said axis to move the leading end portion of said bar beyond said spindle, and a device clamping said bar adjacent said leading end portion;
   an electrochemical machining assembly including at least one machining cathode located outside said spindle and slidably mounted so as to be able to be movable to said leading end portion of said bar projecting beyond said spindle, and a spraying device spraying an electrolyte liquid to wet said leading end portion of said bar; and a control device controlling said spindle and said electrochemical machining assembly;

said spindle also including a seal preventing the electrolyte liquid from travelling back along said bar to reach said clamping device and said feeding device.

15. An apparatus according to claim 14, wherein said machining assembly includes a cutting electrode for cutting off said leading end portion of said bar after it has been machined to form the required part.

16. An apparatus according to claim 14, wherein said longitudinal axis of said spindle comprises a horizontal axis.

17. An apparatus for producing three-dimensional parts from a metal bar by electrochemical machining, comprising:

a frame;

a spindle holding and feeding said metal bar and defining a longitudinal axis, said spindle including a support supporting said bar with a longitudinal axis thereof substantially aligned with said longitudinal axis of said bar, a device feeding said bar along said axis to move the leading end portion of said bar beyond said spindle, and a device clamping said bar adjacent said leading end portion;

an electrochemical machining assembly including at least one machining cathode located outside said spindle and slidably mounted so as to be able to be movable to said leading end portion of said bar projecting beyond said spindle, and a spraying device spraying an electrolyte to wet said leading end portion of said bar; and a control device controlling said spindle and said electrochemical machining assembly;

said spindle also including a seal preventing the electrolyte liquid from travelling back along said bar to reach said clamping device and said feeding device wherein said seal defines a cavity surrounding said bar, and an air supply source supplying air to said cavity at a pressure higher than atmospheric pressure, said cavity allowing the air to escape around the bar in a direction towards said leading end of the bar.

* * * * *